United States Patent [19]

Nomura et al.

[11] Patent Number: 4,535,376
[45] Date of Patent: Aug. 13, 1985

[54] MAGNETIC HEAD INCORPORATING AN AMORPHOUS MAGNETIC METALLIC FILM HAVING A THICKNESS EQUAL TO A TRACK WIDTH

[75] Inventors: Noboru Nomura, Kyoto; Eiichi Hirota, Hirakata; Kiyotaka Wasa, Nara, all of Japan

[73] Assignee: Matsushita Electric Industrial Co., Ltd., Osaka, Japan

[21] Appl. No.: 358,608

[22] Filed: Mar. 15, 1982

Related U.S. Application Data

[63] Continuation-in-part of Ser. No. 17,537, Mar. 5, 1979, abandoned.

[30] Foreign Application Priority Data

Mar. 3, 1978 [JP] Japan .................................. 53-24888

[51] Int. Cl.³ .............................................. G11B 5/12
[52] U.S. Cl. .................................................. 360/126
[58] Field of Search ............... 360/126, 127, 119, 120, 360/113, 122

[56] References Cited

U.S. PATENT DOCUMENTS 3,453,398 7/1969 Manders ............................... 360/126
4,079,430 3/1978 Fujishima et al. ................... 360/126

FOREIGN PATENT DOCUMENTS 52-74325 6/1977 Japan .................................. 360/126

Primary Examiner—Robert L. Richardson
Attorney, Agent, or Firm—Wenderoth, Lind & Ponack

[57] ABSTRACT

A magnetic head includes at least a core for constituting a magnetic circuit and a magnetic gap formed in the core. The core comprises an amorphous magnetic metallic film formed on a non-magnetic high-resistance substrate so that one of the end faces of the non-magnetic high-resistance substrate and the amorphous magnetic metallic film may be brought into contact with a magnetic recording medium.

24 Claims, 15 Drawing Figures

MAGNETIC HEAD INCORPORATING AN AMORPHOUS MAGNETIC METALLIC FILM HAVING A THICKNESS EQUAL TO A TRACK WIDTH

This application is a continuation-in-part application of U.S. patent application Ser. No. 17,537 filed Mar. 5, 1979, now abandoned.

BACKGROUND OF THE INVENTION

The present invention relates to a magnetic head including a magnetic core in which an amorphous magnetic metallic thin film is caused to adhere to a high-resistance substrate.

No magnetic core materials have been provided to satisfy properties such as magnetic flux density, abrasion resistance, permeability in a high-frequency zone or the like. In particular, although materials having higher permeability in the high-frequency zone are oxide magnetic materials, these materials, when they are applied to magnetic heads used for high density recording, are not practical due to the low magnetic flux density. Also, the metallic magnetic materials do not provide higher permeability in the high-frequency zone due to eddy-current loss although they provide high saturation magnetic flux density. In addition, since the metallic materials have inferior abrasion resistance, the practical use of the metallic materials is difficult in devices such as a magnetic head, where the magnetic materials come in direct sliding contact. In the high frequency zone, the eddy-current loss prevails in the metallic materials and, thus, a substrate on which amorphous thin films are formed requires the selection of a high resistance material. Generally, the high-resistance material has inferior heat conduction properties and it is difficult to form the amorphous metallic thin films on the material. Furthermore, it is difficult to cause the amorphous films to firmly adhere to the material so that the amorphous films will not come off during a processing operation, a sliding operation or the like. In the conventional methods, the amorphous films can not be obtained due to excessively raised substrate temperatures, and the amorphous films might come off, during the thin film forming operation or the processing operation of the device, due to weaker adherence force between the substrate and the amorphous film. The present invention provides a magnetic head having excellent high-frequency characteristics wherein at least a portion of a magnetic core, which is brought into contact with a magnetic recording medium, is made of an amorphous magnetic metallic material having a high saturation magnetic flux density. To improve the high-frequency characteristics according to this invention, the amorphous metallic films are caused to firmly adhere through an oxidation film, etc., to the high-resistance substrate to provide the practical magnetic heads. Also, the composition equation of the amorphous magnetic metallic films is as follows:

$$T_{1-x}G_x \quad 0.1 \leq x \leq 0.3$$

wherein T is at least one element selected from the iron family elements consisting of Fe, Co and Ni, and G is at least one element selected from the group consisting of semi-metals, group IVa elements and group Va elements.

Since the crystallization temperature of the amorphous magnetic metallic films is as relatively low as approximately 450° C., the temperature of the substrate has to be kept low. Thus, since it is difficult to provide the amorphous films having smaller coercive force on the high-resistance substrate, in this invention, the manufacturing method with respect to the conditions for forming the amorphous magnetic metallic films will be described.

Conventionally, as the magnetic core material for a narrow track magnetic head, no materials have been provided to satisfy properties such as magnetic flux density, abrasion resistance, permeability in the high-frequency zone or the like. Thus, a conventional narrow track magnetic head of such construction as shown in FIGS. 1(A) and 1(B) has been widely used.

Figure 1:
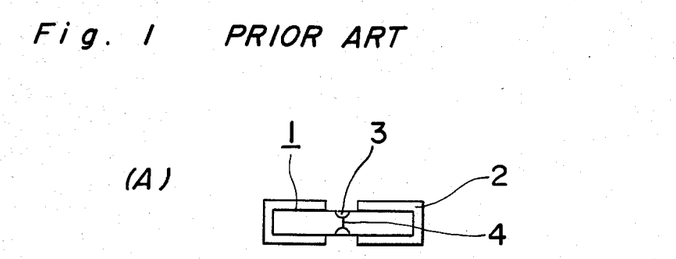
FIG. 1(A) is a front view of a conventional narrow track magnetic head.
FIG. 1(B) is a plan view of the conventional narrow track magnetic head of FIG. 1(A)

As shown in FIGS. 1(A) and 1(B), in the magnetic head, a magnetic head core 1 is composed of an oxide magnetic material such as a single crystal ferrite, multiple crystal ferrite or the like. A notch, which is formed in the head gap portion 4, is filled with a non-magnetic material 3 such as glass or the like, and a coil 2 is wound around the core 1.

The oxide magnetic material is generally superior in abrasion resistance. A notch is provided on the core and is filled with the glass or the like. Thus, a magnetic head having a narrower track and superior abrasion properties is achieved. However, the oxide magnetic material has a smaller saturation magnetic flux density as compared with an alloy magnetic material such as permalloy or the like. Thus, when a magnetic head made of an oxide magnetic material is used for recording on the magnetic recording medium having a high coercive force, a large amount of magnetic flux is required to flow, and thus the core is magnetically saturated, so that sufficient recording on the magnetic recording medium cannot be performed. Meanwhile, since the oxide magnetic material does not allow plastic working such as blanking or the like to be performed thereon, processing operations such as precision cutting, surface grinding or the like are required to obtain the core of the oxide magnetic material. In addition, the surface affected layers produced by machining have to be removed. Accordingly, the manufacturing process of the magnetic head becomes extremely complicated, thus resulting in a higher manufacturing cost of the magnetic head. Furthermore, when such material is used as the magnetic head, chipping or grain dropping is caused at the gap portion due to the fragile property of the material.

On the other hand, the alloy magnetic material has a superior magnetic property, but has an inferior abrasion resistance. Accordingly, when the alloy magnetic material is used as the magnetic head, a portion in contact with the magnetic recording medium is substantially deformed, with the result that the gap portion is disadvantageously magnetically short-circuited.

SUMMARY OF THE INVENTION

It is an object of this invention to improve the above-described disadvantages of the conventional magnetic heads by using amorphous magnetic metallic films formed on a high-resistance substrate as the core material.

It is another object of this invention to provide a magnetic apparatus of a fundamental construction employing amorphous magnetic thin films wherein a composition equation is $T_{1-x}G_x$, $0.1 \leq x \leq 0.3$ (T is at least one element selected from the iron family elements consisting of Fe, Co and Ni, and G is at least one element selected from the group consisting of semi-metals, group IVa elements and group Va elements).

According to this invention, amorphous magnetic metallic films having high permeability are provided when the formation is made on a high-resistance substrate, where no eddy-current loss is caused in a high-frequency zone, by a sputtering deposition method, under the conditions where the pressure P of the sputtering gas is $5\times10^{-4} \leq P \leq 5\times10^{-3}$ (Torr), and the substrate temperature T is $0°$ C. $\leq T \leq 450°$ C. Magnetic apparatuses such as a magnetic head, a delay line, a transformer, etc. are considered as apparatuses with coils wound around the amorphous magnetic films. However, in order to cause the amorphous magnetic thin films to adhere to the substrate so that the thin films will not come off when the amorphous magnetic thin films are processed, an oxide of an amorphous magnetic thin film material is formed on the substrate so that the amorphous magnetic thin film will adhere thereto. Also, when a plurality of amorphous magnetic thin films each having a different constant are formed into a laminate of layers, characteristics not provided through one layer of thin film, for example, the magnetic characteristics in the high-frequency zone, the propagation speed of the elastic wave or the like, can be changed.

BRIEF DESCRIPTION OF THE DRAWINGS

These and other objects and features of this invention will become more apparent from the following detailed description taken in conjunction with preferred embodiments thereof with reference to the accompanying drawings, in which.

Before the description of the present invention proceeds, it should be noted that like parts are designated by like reference numerals throughout the several views of the accompanying drawings.

DETAILED DESCRIPTION OF THE INVENTION

Figure 2:
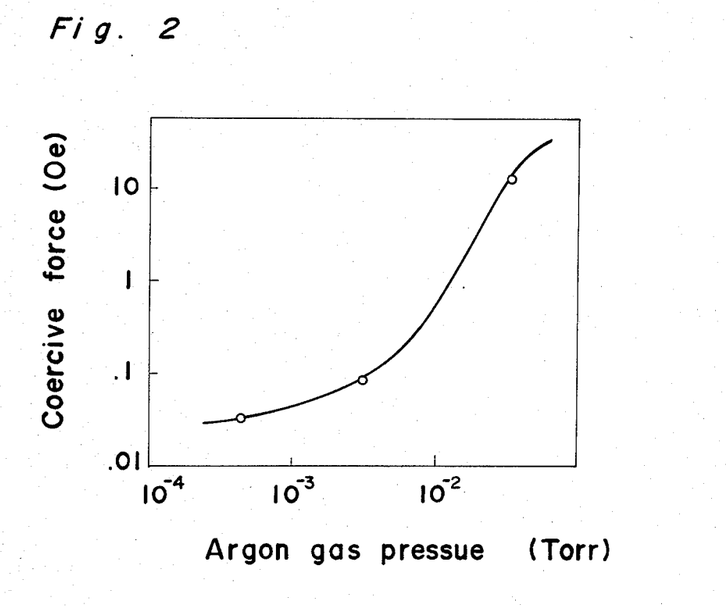
FIG. 2 is a graph showing variations of the coercive force of an amorphous magnetic material made by a RF sputtering method, with respect to pressures of argon gas during the sputtering operation.

One method of manufacturing an amorphous metallic film is the radio frequency (RF) sputtering method. When this method is used to form thin films, it is difficult to produce films having low coercive force and the speed of forming the films is slow under the influence of argon gas, the sputtering atmosphere, thus resulting in an impractical operation. As is well known, this RF sputtering method comprises the steps of ionizing, in a high-frequency alternating electric field, the argon gas (inert gas is used as the sputtering gas) having a pressure of approximately $(1-10)\times10^{-2}$ Torr, bringing the argon ions into collision against the target located on the cathode side with an energy of approximately 1 KeV to sputter the target material and forming the film of approximately the same composition as that of the target material on the support substrate located on the anode side. However, as shown in FIG. 2, the coercive force is related to the argon gas pressure during sputtering, and the coercive force of the film formed under the argon gas pressure of $4\times10^{-2}$ Torr used by the above-described RF sputtering method is too large for practical use.

Figure 3:
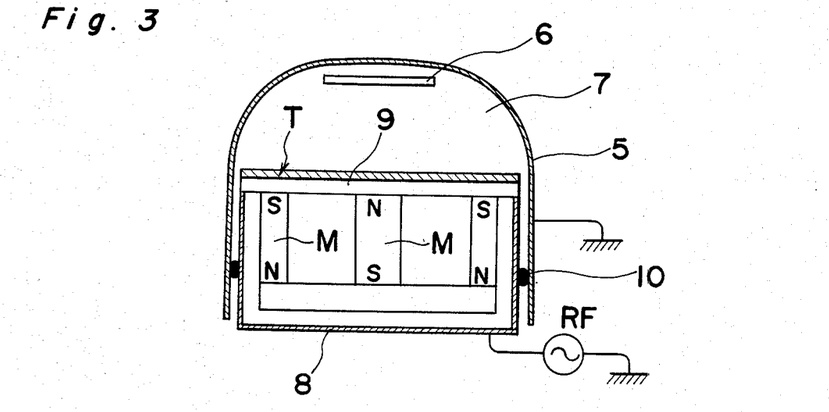
FIG. 3 is a schematic cross-sectional view showing a magnetron type sputtering apparatus for employing an RF sputtering method to form this invention.

FIG. 3 is a schematic view of a magnetron type sputtering apparatus to be used in the RF sputtering method, the magnetron type sputtering apparatus being different from the conventional sputtering apparatuses in the construction of the cathode portion 8 to which the high-frequency voltage is applied. Magnets M are provided inside the cathode so that the magnetic field may be applied to the proximity of a target T. The plasma density near the target becomes higher, as compared with that of the ordinary sputtering apparatuses, due to the effect of the magnetic field to be applied to the proximity of the target. Accordingly, the plasma can be maintained stable even under lower argon gas pressure conditions. However, when the argon pressure becomes $5\times10^{-4}$ Torr or lower, the plasma cannot be maintained stable any longer. When a high-resistance substrate 6 is placed in the low argon gas atmosphere 7 and the amorphous magnetic metal thin films are caused to adhere to the substrate, the temperature rise in the substrate is small, and magnetic films having low coercive force are provided. This is true since during the deposition of the amorphous magnetic metal thin film under the higher argon gas pressure, each of the deposited films is adapted to have a fibrous structure in its film forming direction, by the effect of the substrate temperature and the argon gas pressures, and the boundary of the fibrous structure affects the coercive force. The fibrous structure is produced conspicuously when the substrate temperature is lower and the argon gas pressure is higher. Meanwhile, the substrate temperature rises due to the heat radiation from the target side, and consideration is required to be given so that the substrate temperature may not exceed $450°$ C., i.e. the crystallization temperature of the amorphous metal. In some cases, the substrate is required to be forcedly cooled with refrigerant such as water, liquid nitrogen or the like. When the thin film is formed at extremely low temperature, the fibrous structure is produced, and therefore, the temperature of the substrate should be $0°$ C. or higher. As described hereinabove, it is necessary to maintain the substrate temperature at a relatively low temperature and reduce the fibrous structure in the deposited film by lowering pressure of the argon gas so as to form the amorphous films. This requirement is realized by the magnetron type sputtering apparatus. The magnetron type sputtering apparatus is classified into a planer type and a coaxial type. In the coaxial type of magnetron sputtering apparatus, the magnetic field is applied inside the film face of the sample. Accordingly, the planer type magnetron sputtering apparatus is preferred when the isotropic film is fabricated inside the film face. However, in the case of the planer type, as shown in FIG. 3, the target T made of the magnetic material is disposed to magnetically short-circuit the magnet M, which is arranged to provide the magnetic field, and thus, it should be so arranged that the magnetic flux applied by the magnet M magnetically saturates the target to a sufficient degree. In FIG. 3, there are a vacuum chamber 5 and an insulator and a vacuum packing 10 each insulating the high-frequency voltage. When the thin films of the intended composition are fabricated directly on the support substrate, the formed films come off from the support substrate due to the internal stress as the thin films become thicker. Therefore, a layer, which is fitted, in properties, for the support substrate and the intended thin films, is interposed therebetween to improve the bonding force of the thin films with respect to the support substrate, whereby amorphous metallic thin films which have sufficient thickness are provided. Concretely, at first, oxygen gas is mixed with the argon gas, and the oxygen partial pressure is gradually reduced as the sputtering proceeds, until the oxygen partial pressure becomes zero. The oxidation degree is gradually reduced from the support substrate side until the thin films are fabricated as the amorphous magnetic alloy. The amorphous magnetic metal thin film formed on the support substrate as described hereinabove does not come off from the support substrate even if it is made considerably thick. An amorphous magnetic metallic film of required thickness can be formed uniformly on the substrate made of the oxide such as glass and the like. In a magnetic head having a large track width or a magnetic head requiring both excellent high-frequency characteristics and a large track width, the non-magnetic material layers and amorphous magnetic metallic layers are alternately formed into a laminate of layers. The use, for the non-magnetic material layer, of a material having higher specific resistance such as SiO, $SiO_2$, oxide of such composition as to form the amorphous metallic layer or the like reduces the skin effect, thus resulting in improved high-frequency characteristics as a whole. High-resistance materials such as glass, etc. are desired to be used as the substrate material, and the use of a non-magnetic metal such as copper or the like for the support substrate generates eddy-currents in the substrate due to the low substrate resistance, with the result that a loss is caused. Thus, even if the characteristics of the magnetic material are improved, sufficient high-frequency characteristics cannot be provided as a whole. Accordingly, the support substrate for use in magnetic heads is desirably composed of the high-resistance material.

After the amorphous magnetic metallic thin film has been formed on the high-resistance substrate as described above, the amorphous magnetic metallic thin film and substrate are processed to a predetermined profile. Then, opposite ends of the amorphous magnetic metallic thin film are ground with a high precision so that a portion of the opposite ends may form gap faces. A non-magnetic material such as $SiO_2$, etc. is deposited on the ground gap faces and the gap faces are caused to butt against each other so that a magnetic gap may be formed through fusing therebetween by means of glass etc. At present, a narrow gap magnetic head having a gap of about 0.3 μm for recording in the short-wavelength zone is manufactured. One example of such a narrow gap magnetic head is shown in FIG. 4(A).

Figure 4:
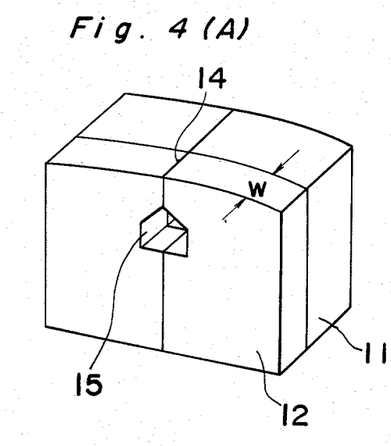
FIGS. 4(A) and 4(B) are a perspective view of a core of a magnetic head according to one preferred embodiment of the present invention and a modification thereof, respectively.

Referring to FIG. 4(A), there is shown a core of a magnetic head according to one preferred embodiment of the present invention, in which a Fe-Co-Si-B series amorphous magnetic metallic thin film 12 of 1~20 μm in thickness is deposited on a non-magnetic insulating substrate 11 made of glass, sapphire or alumina, etc., having a thickness of about 1 mm. The non-magnetic insulating substrate 11 on which the amorphous magnetic metallic thin film 12 has been deposited is cut to a predetermined profile, while faces forming a magnetic gap 14, and a magnetic core window 15 are formed. Two pieces of the core formed as described above are caused to butt against each other so that the magnetic gap forming faces may confront each other, and are fused by the use of glass, etc. with the magnetic gap 14 being interposed therebetween. In this embodiment, the thickness of the amorphous magnetic metallic thin film 12 becomes a track width W. Since the amorphous magnetic metallic thin film 12 has excellent magnetic properties and satisfactory abrasion resistance, it is suitable for a narrow track magnetic head.

Meanwhile, in the case where glass, sapphire, or alumina, etc. having satisfactory abrasion resistance is used as the substrate 11, abrasion of the core due to its sliding contact with a magnetic recording medium is determined by abrasion of the substrate 11 and thus, superior abrasion resistance of the core can be obtained compared to the case where only the amorphous magnetic metallic thin film 12 having excellent abrasion resistance is used.

Meanwhile, since a magnetic recording medium with a high resolution power has a high coercive force Hc, a number of magnetic fluxes are required to be supplied thereto for recording, so that the amorphous magnetic metallic thin film 12 is saturated or almost saturated magnetically, thus resulting in reduction of permeability thereof. When the permeability decreases, larger magnetomotive force is required, thereby resulting in reduction of the recording efficiency.

Furthermore, if a magnetic circuit of the core is composed of the thin film 12 only, magnetic resistance becomes large at the time of sound reproduction, thus resulting in reduction of the reproducing efficiency.

In order to solve the above-described problems, there is shown in FIG. 4(B), a modified core wherein a portion 16 of the high-resistance support substrate 11, which is spaced apart from a portion thereof in sliding contact with the magnetic recording medium, is made of a magnetic material having high permeability so as to improve the recording efficiency and reproducing efficiency.

In the case of metallic materials, high-frequency characteristics are determined by eddy-current loss. The eddy-current loss can be estimated by a skin depth S to which the skin effect may be applied. The skin depth S is represented by the following equation:

$$S = \sqrt{\frac{2\rho}{\omega\mu}}$$

where:

$\rho$ = specific resistance of the amorphous metallic thin film, $\Omega$m, $\mu$ = permeability of the amorphous metallic thin film, and $\omega$ = angular frequency of current flowing in coils wound around the amorphous metallic thin film.

In the case where a substrate of 1 mm in thickness is made of copper, a problem arises even at a frequency of 60 Hz. However, in the case where the substrate is made of a high-resistance material, the amorphous metallic thin film has such characteristics as $\rho = 4 \times 10^{-6}$ $\Omega$m and $\mu = 10^4$, so that its high-frequency characteristics are expanded to 100 KHz if the amorphous magnetic metallic thin film has a thickness of 30 $\mu$m. Especially, in the case where the amorphous magnetic metallic thin film has a thickness of 5 $\mu$m or less, satisfactory characteristics are expanded up to a frequency zone of 4 MHz or more, whereby the amorphous magnetic metallic thin film can be preferably applied to a magnetic head for use in an electronic computer of which high-frequency characteristics are required.

Figure 5:
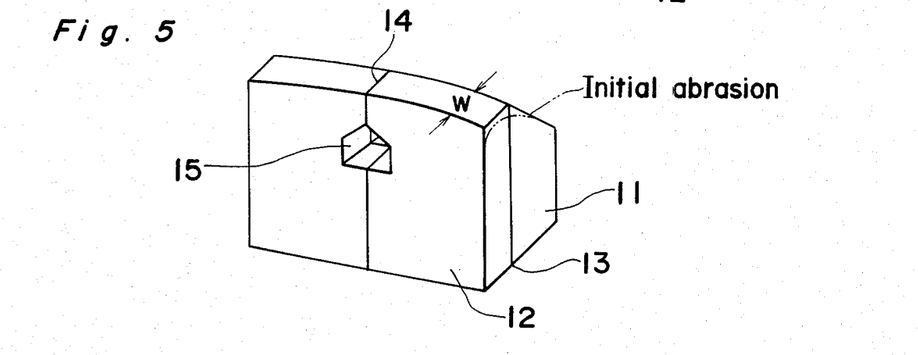
FIG. 5 is a perspective view similar to FIG. 4(A), particularly showing a further modification thereof.

Referring to FIG. 5, there is shown a further modified core in which the amorphous magnetic metallic thin film 12 only is brought into contact with the magnetic recording medium. In this core, the high-resistance substrate 11 is formed slantways with respect to a face of the thin film 12 which is in sliding contact with the magnetic recording medium, so that after initial abrasion of the core by the magnetic recording medium, the core is brought into a more satisfactory sliding contact with the magnetic recording medium. Furthermore, a non-magnetic material layer 13 is interposed between the high-resistance substrate 11 and the amorphous magnetic metallic thin film 12, whereby the bonding property therebetween is improved.

Meanwhile, it is desired that the gap portion be composed of a non-magnetic material such as glass or the like, which is approximately equal in thermal expansion coefficient to the amorphous magnetic metallic thin film. Particularly, when the gap portion is formed through adhesion by the RF sputtering apparatus or the like, the amorphous magnetic metallic film and the non-magnetic gap material are firmly bonded with each other, whereby excellent abrasion resistance is obtained in magnetic heads such as a video head, which are brought into sliding contact with a magnetic recording medium at a large relative speed. However, since there is a difference in abrasion resistance between the glass and the amorphous magnetic metallic film, a surface of the glass gap portion and that of the amorphous metallic film, which are brought into contact with the magnetic recording medium, are displaced from each other so as to form an uneven surface after a long period of use. To improve the abrasion resistance properties, the non-magnetic material layer of the gap material is required to be composed of an amorphous non-magnetic metallic film. When the non-magnetic amorphous metallic film, which is similar, in physical properties, to the amorphous magnetic metallic film, is formed on the amorphous magnetic metallic thin film used for the core, both the films are well fitted for each other and become almost equal in abrasion resistance, so that the surface of the gap portion and that of the amorphous metallic film, which are brought into sliding contact with the magnetic recording medium, are scarcely displaced from each other even after a long period of use, and thus, the sliding faces are maintained smooth.

As described hereinabove, in the magnetic head of one example of the magnetic apparatus of the present invention, the conditions such as magnetic saturation of the magnetic core, abrasion resistance and magnetic characteristics in the high-frequency region can be satisfied through the structure in which the amorphous magnetic metallic thin film is caused to adhere to the high-resistance substrate.

Figure 6:
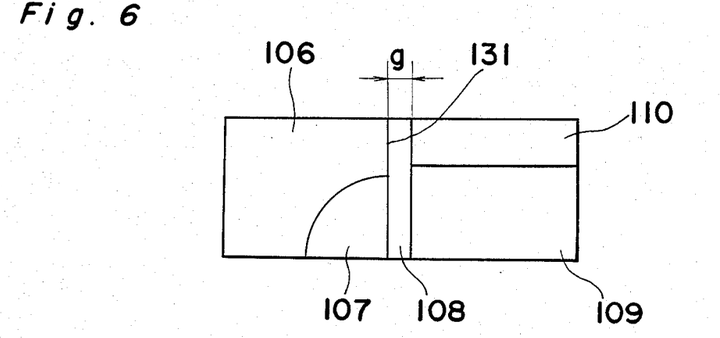
FIG. 6 is a plan view showing the core of a magnetic head according to another embodiment of this invention.

FIG. 6 shows another embodiment of the magnetic head in accordance with this invention, which is fundamentally composed of an oxide magnetic material 106 constituting a half section of the head core, a non-magnetic material layer 107, a non-magnetic high-resistance substrate 109 and an amorphous alloy layer 110. The non-magnetic high-resistance substrate 109 is provided at the opposite side of a gap face 131 for forming a magnetic gap g from the oxide magnetic material 106 so that a surface of the oxide magnetic material 106 and that of the non-magnetic material layer 107 may be displaced from each other so as to form an uneven portion. The amorphous alloy layer 110 is provided on the non-magnetic high-resistance substrate 109 so as to fill the gap portion so that its end face may confront, through a magnetic gap layer 108 in the magnetic gap g, the gap face 131. Meanwhile, the non-magnetic material layer 107 is filled in a concave portion which is formed on the gap face 131 side of the oxide magnetic material 106 so as not to extend into the track portion. Thus, the oxide magnetic material 106 is tapered in shape on the gap face 131 side to increase the magnetic flux density on the gap face 131.

The magnetic head of the above-described arrangement can be made by a manufacturing method as described hereinafter.

The face side which becomes the gap face 131 for constituting the magnetic gap g is made concave so as not to extend into the track portion, and the non-magnetic material layer 107 is filled in the concave portion. The face, which becomes at least the gap face 131 of the oxide magnetic material 106 such as ferrite or the like, is ground to a mirror face. Thereafter, a non-magnetic material such as glass or the like is caused to adhere to the ground gap face 131 by sputtering deposition to form the magnetic gap layer 108. Then, the non-magnetic high-resistance substrate 109 made of a non-magnetic insulating material such as glass or the like is bonded on the magnetic gap layer 108, so as to confront a portion of the gap face 131, which is substantially displaced from the track portion of the gap face 131. When the material constituting the magnetic gap layer 108 melts into the substrate 109 or inversely the material of the substrate 109 oozes into the magnetic gap layer 108, the spacing of the magnetic gap g becomes unstable, so that the magnetic gap g cannot be precisely formed into a narrow gap of 1 micron or less, and thus the adhesion of the substrate 109 is effected so that the non-magnetic insulating material constituting the substrate 109 and the material constituting the magnetic gap layer 108 may be mutually diffused. In the adhesion through the mutual diffusion, although the material constituting the substrate 109 and the material constituting the magnetic gap layer 108 are mutually diffused, the material constituting the magnetic gap layer 108 does not flow one-sidedly into the substrate 109 to reduce thickness thereof, or on the contrary the material constituting the substrate 109 does not oozes into the magnetic gap layer 108 to increase the thickness of the magnetic gap g. Thus, the non-magnetic insulating substrate 109 is secured to the oxide magnetic material 106 through the magnetic gap layer 108 so that the top face of the substrate 109 may be displaced from that of the oxide magnetic material 106 so as to form an uneven portion. Then, the amorphous alloy layer 110 is formed on the non-magnetic material insulating substrate 109 by the above-described sputtering deposition method.

Thereafter, a winding window (not shown) is provided on the given portion, and the winding (not shown) is provided through the winding window to complete the magnetic head.

Figure 7:
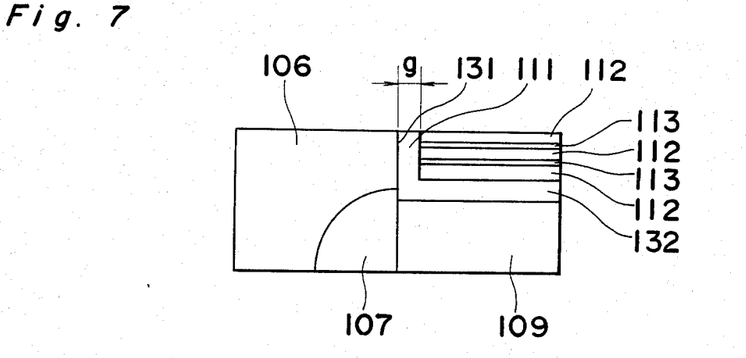
FIG. 7 is a plan view similar to FIG. 6, particularly showing a modification thereof.

FIG. 7 shows a magnetic head according to still another embodiment of the present invention. The difference between FIG. 6 and FIG. 7 lies in that the oxide magnetic material 106 and the non-magnetic material insulating substrate 109 are caused to adhere to each other through the magnetic gap layer 108 in the case of FIG. 6, while in FIG. 7 the oxide magnetic material 106 is caused to adhere directly to the non-magnetic material insulating substrate 109. In FIG. 7, the non-magnetic material insulating substrate 109 is caused to adhere to the oxide magnetic material 106, through the non-magnetic material layer 107 provided in the concave portion of the oxide magnetic member 106, by a method of mutual diffusion or the like. The glass or the non-magnetic amorphous alloy is caused to adhere, by a method such as the sputtering deposition method or the like, to the gap face 131 of the oxide magnetic material 106 secured to the non-magnetic insulating substrate 109, thereby to form a magnetic gap layer 111. At the same time, the glass or the non-magnetic amorphous alloy is caused to adhere to the top face of the non-magnetic insulating substrate 109 to form a bonding layer 132. When, as a material of the bonding layer 132 to be formed on the non-magnetic material insulating substrate 109, a material such as the above-described non-magnetic amorphous alloy or the like which is well fitted, in properties, for the amorphous alloy layer formed into a laminate of layers on the bonding layer 132 is used, the amorphous alloy layer 112 can be caused to firmly adhere to the substrate 109. Meanwhile, since the amorphous alloy 112 generally has a specific resistance as relatively low as several hundreds $\mu\Omega cm$, the skin depth becomes several microns, so that when the track width is formed of one amorphous alloy layer 112, the magnetic property in the high-frequency zone may become worse. Accordingly, as shown in FIG. 7, the amorphous alloy layers 112 are formed into a laminate of layers alternately with layers 113 made having a high specific resistance, thus resulting in better magnetic characteristics in the high frequency zone.

As described in the above embodiment, the amorphous alloy is used for one portion of the head core half section to make the saturation magnetization larger. In addition, the high frequency magnetic properties are better in the laminating construction, and all the characteristics such as superior abrasion resistance or the like which are required of the magnetic head are satisfied. Furthermore, since the thickness of the amorphous alloy layer formed through adhesion by the sputtering method is the track width, a magnetic head having a narrow track can be precisely formed.

Figure 8:
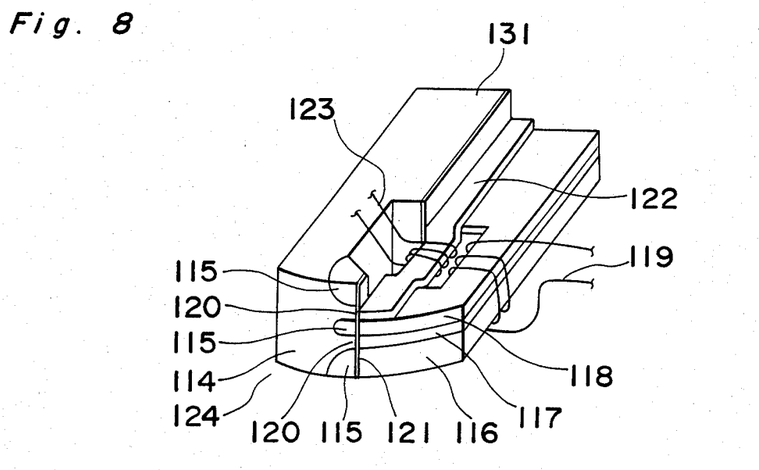
FIG. 8 is a perspective view showing a magnetic head according to a further embodiment of this invention.

FIG. 8 shows a magnetic head according to a further embodiment of this invention. In this case, it is so arranged that one construction unit of the head core half section in the above-described embodiment is provided to be placed upon another unit, thereby to serve for two-channel application. In this embodiment, a magnetic material portion 120 which has a width approximately corresponding to the width of the track is formed in advance on the gap face 131 of the oxide magnetic material 114, by a groove filled with a non-magnetic material layer 115, thereby to be finished as a one head core half section. Meanwhile, a magnetic gap layer 121 is caused to adhere to the gap face 131 of the oxide magnetic material 114 throughout by a sputtering method or the like as described hereinabove. Then, a non-magnetic material substrate 116 is caused to adhere to the magnetic gap layer 121 as described hereinabove, and the amorphous alloy layer 117 is further caused to adhere to the non-magnetic material substrate 116. The amorphous alloy layer 117 is partially removed by an etching method or the like for easier winding of coils 119 and 123. A non-magnetic material layer 118, which has a thickness corresponding to the track spacing, is formed on the amorphous alloy layer 117 thus formed. Moreover, an amorphous alloy layer 122, which is a second track, is caused to adhere to the non-magnetic material layer 118 to be finished as the other head core half section.

Thereafter, the coils 119 and 123 are wound to complete the magnetic head for the two-channel arrangement. When the multi-channel magnetic head is manufactured in the above manner, the multi-channel head of a narrow gap and narrow track can be easily obtained. Also, the gap-in-line property peculiar to the multi-channel arrangement of the narrow gap is improved, since the faces forming the magnetic gap made at one time across the channels are of high accuracy and the respective amorphous alloy layers are formed through adhesion, by the sputtering operation, along the faces forming the magnetic gap, through the magnetic gap layer.

As described hereinabove, the magnetic head of this invention is composed of a magnetic material and a non-magnetic material substrate so that a top face of the magnetic material and that of the non-magnetic material substrate are displaced from each other so as to form an uneven portion, an amorphous alloy layer provided on the non-magnetic material substrate to fill at least one portion of the uneven portion of the non-magnetic material substrate, and a magnetic gap layer provided between the magnetic material and the amorphous alloy layer, thereby to improve the abrasion resistance and the high-frequency magnetic characteristics and to make the narrower track and the narrower gap easily. Accordingly, the recording operation can be performed, with higher density, on a recording medium having higher coercive force.

The magnetic head with the advantages as described hereinabove can be easily provided by the manufacturing method of this invention. Namely, after the non-magnetic substrate has been provided so as to form the uneven portion with respect to the magnetic material, the amorphous alloy layer is provided, by sputtering deposition method, on the non-magnetic substrate to fill the uneven portion of the non-magnetic substrate, with one end of the amorphous alloy layer being brought into contact with a face at the side of the non-magnetic material of the magnetic material, through a magnetic gap layer. Thus, the magnetic head can be easily provided. Particularly, conventionally it has been so arranged that, after a pair of head core half sections have been lapped to be securely connected with each other at the connection portion, they are fixedly butted each other through the magnetic gap layer, whereby it is difficult to obtain high accuracy in the butting operation. Meanwhile, in this invention, since the amorphous alloy layer can be caused to adhere to the non-magnetic material substrate by the sputtering deposition method, as described hereinabove, with one end of the amorphous alloy layer being provided along the face of the magnetic gap layer, the gap face on the amorphous alloy layer side is accurately formed along the face of the magnetic gap layer to confront the gap face on the magnetic material side. Furthermore, the magnetic gap layer itself is formed through adhesion, for example by the deposition method, whereby the narrow gap can be accurately formed easily between the gap face of the magnetic material and the gap face of the amorphous alloy layer. Moreover, as described hereinabove, the film thickness of the amorphous alloy layer formed through adhesion by the sputtering deposition method is used as the track width, whereby the narrow track can be formed with ease and accuracy.

Figure 9:
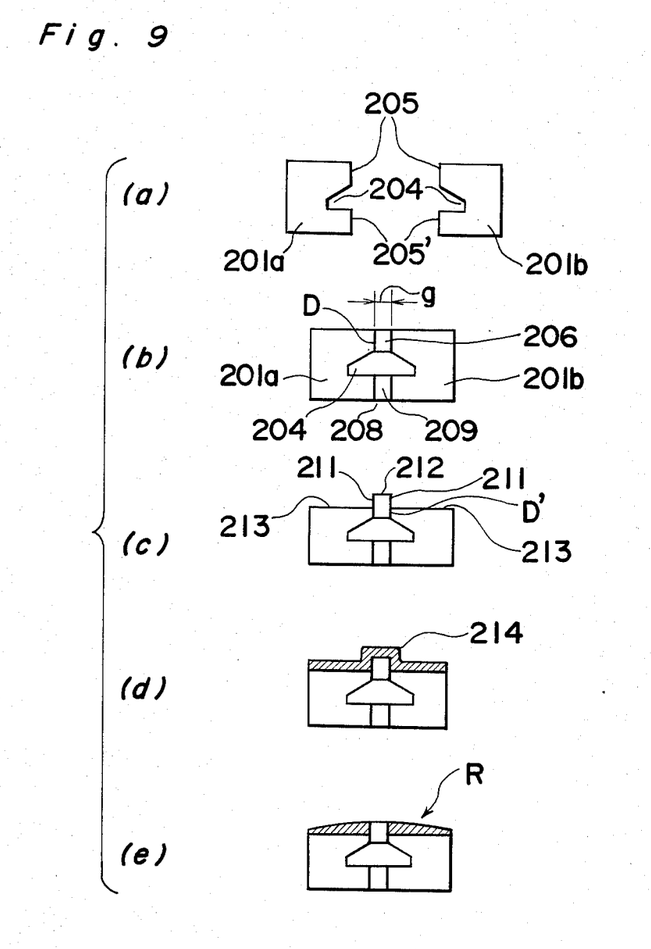
FIG. 9, consisting of (a)-(e) is a flow chart of manufacturing processes for forming a core of the magnetic head of this invention.

Furthermore, FIG. 9 shows the construction of the magnetic head, in accordance with this invention and the manufacturing method thereof. The magnetic head is of a composite type employing the amorphous magnetic metallic film and ferrite. The sliding face of this head, in contact with the magnetic medium, is composed of the amorphous magnetic metallic film. FIG. 9 will be described hereinafter in the order to manufacture. In FIG. 9(a), a ferrite material which has superior high-frequency characteristics is used in the starting point of the head manufacturing. Groove portions 204 each acting as a winding window are provided in advance through a working operation to manufacture core half bodies 201a and 201b having gap forming face portions 205 and 205' which are provided above and below the groove portions so as to be flush with each other and finished to mirror faces.

FIG. 9(b) shows a head body 208 in which a desired front gap width g required of the magnetic head is connected by a glassy gap portion 206, which is fitted, in properties, for ferrite acting as the core material and is the front portion gap. The portion 209 is the back portion gap while the gap depth of the front portion gap 206 is expressed by D. Meanwhile, the portion inside the winding window 204 is a glass material connecting the core half body 201a with the core half body 201b. As this glass material, it is preferable for the manufacturing operation to use a glass which is the same in quality as or has a lower melting point than the glass material used for the portion 206 or the portion 209. In a special case, resin, alloy solder or other materials can be used as the bonding material of the window portion. A ceramic material, or a metallic material in addition to the glass material can be used as the gap material 206.

For forming the gap g, there may be used a method in which after the gap material has been caused to adhere, in advance, to the gap face by sputtering or deposition, the core half bodies are connected with each other (as disclosed in Japanese Patent Publication No. 26886/1972), a method of permeating a gap material through capillarity (as disclosed in Japanese Patent Publication No. 28376/1964), a method of inserting thin pieces into the gap g and the like. The gap g is manufactured by a proper one of these methods.

According to the above-described methods of forming the head gap, the extremely narrow gap width of 1 $\mu$m or less can be easily manufactured with high accuracy.

The important feature of this invention is that in the head core shown in FIG. 9(b) the surface core portion is removed, by a proper working means, from the ferrite core portion near the front portion gap 206 of the head body 208 as shown in FIG. 9(c), to substitute it with an amorphous magnetic alloy film, which better converges the magnetic flux than the core and is superior in abrasion resistance. Namely, since core portions are removed from both sides of the glass gap portion 206, glass faces 211 are projected out of both sides of the gap portion, so that an uneven portion is provided between the gap portion tip 212 and the core front face portions 213.

The above-described core portion can be removed by an electrolytic etching operation in an electrolyte containing phosphoric acid and dense sulfuric acid. As shown in FIG. 9(d), the amorphous magnetic alloy film which has a high magnetic flux density is caused to fully adhere, by sputtering deposition, to both side faces 211 of the gap material of the gap portion 206 of FIG. 9(c) and the core front portion 212, thereby to constitute the amorphous magnetic alloy film portion 214.

Referring to FIG. 9(e), the front face is processed into a required shape R, by providing the head gap depth D2, which is finally required from the front face of the core provided in FIG. 9(d), to complete the head body 206 (the winding coil is omitted). As described hereinabove, in the magnetic head of this invention, wall portions of glass acting as the gap are first formed by the electrolytic etching operation. Thereafter, adhesion of the amorphous magnetic metallic film as the magnetic material layer can be performed by sputtering, and thus close adherence between the core and the gap is superior. Moreover, the desired gap width can be selected to perform sputtering deposition of the magnetic layer so that the manufacturing processes are improved, quality of the magnetic head is stably ensured, and reductions in manufacturing processes and manufacturing cost thereof can be realized.

Furthermore, in the magnetic head of the present invention, since an amorphous magnetic metallic film is used as a core material, the high frequency characteristics are improved. In addition, the amorphous magnetic metallic film and a non-magnetic high-resistance substrate are formed into one unit, abrasion of the core due to its contact with a magnetic recording medium is remarkably reduced. Moreover, when the amorphous magnetic metallic film is formed by a sputtering deposition method under conditions that the pressure of the sputtering gas ranges from $5 \times 10^{-4}$ to $5 \times 10^{-3}$ torr and the temperature of the non-magnetic high-resistance substrate ranges from 0° to 450° C., a core having excellent magnetic properties suited for a component of the magnetic head can be obtained.

Although the present invention has been fully described by way of example, it should be noted that various changes and modifications are apparent to those skilled in the art and, therefore, unless otherwise they depart from the true scope of the present invention they should be construed as included therein.

What is claimed is:

1. A magnetic head including at least a core for constituting a magnetic circuit, and a magnetic gap formed in said core, said core comprising:
   a support substrate having a first face which is brought into contact with a magnetic recording medium;

a portion including said first face of said support substrate or said substrate as a whole being made of a non-magnetic high-resistance material; and an amorphous magnetic metallic film deposited on one or a plurality of faces of said support substrate, which abut on said first face of said support substrate, and deposited at least on said non-magnetic high-resistance material portion, said amorphous magnetic metallic film having a thickness equal to a track width.

2. A magnetic head as claimed in claim 1, wherein said thickness of said amorphous magnetic metallic film is between 1 and 30 μm.

3. A magnetic head as claimed in claim 1, wherein said amorphous magnetic metallic film has a thickness of between 1 and 5 μm.

4. A magnetic head as claimed in claim 1, wherein said support substrate is composed of said non-magnetic high-resistance material portion and a portion made of a material having high permeability in one unit.

5. A magnetic head as claimed in claim 1, wherein said amorphous magnetic metallic film includes at least one element selected from iron family elements consisting of iron, nickel and cobalt.

6. A magnetic head as claimed in claim 1, wherein said amorphous magnetic metallic film is made of at least one element selected from the group consisting of iron family elements composed of iron, nickel and cobalt, semi-metals, group IVa elements and group Va elements.

7. A magnetic head including at least a core for constituting a magnetic circuit, and a magnetic gap formed in said core, said core comprising:

a first core portion and a second core portion in one unit so that said first core portion and said second core portion confront each other through said magnetic gap therebetween;

at least either one of said first core portion and said second core portion being formed with a first face which is brought into contact with a magnetic recording medium;

a portion including said first face of at least either one of said first core portion and said second core portion being made of a non-magnetic high-resistance material; and an amorphous magnetic metallic film deposited on one face of at least either one of said first core portion and said second core portion, which abuts on said first face, said amorphous magnetic metallic film having a thickness equal to a track width.

8. A magnetic head as claimed in claim 7, wherein said first core portion and said second core portion are made of a material of high permeability.

9. A magnetic head as claimed in claim 7, wherein said thickness of said amorphous magnetic metallic film is between 1 and 30 μm.

10. A magnetic head as claimed in claim 7, wherein said thickness of said amorphous magnetic metallic film has a thickness of between 1 and 5 μm.

11. A magnetic head as claimed in claim 7, wherein said amorphous magnetic metallic film includes at least one element selected from iron family elements consisting of iron, nickel and cobalt.

12. A magnetic head as claimed in claim 7, wherein said amorphous magnetic metallic film is made of at least one element selected from the group consisting of iron family elements composed of iron, nickel and cobalt, semi-metals, group IVa elements and group Va elements.

13. A magnetic head including at least a core for constituting a magnetic circuit, and a magnetic gap formed in said core, said core being composed of:

a first core portion and a second core portion in one unit so that said first core portion and said second core portion confront each other through said magnetic gap therebetween;

at least either one of said first core portion and said second core portion being formed with a first face which is brought into contact with a magnetic recording medium;

a portion including said first face of at least either one of said first core portion and said second core portion being made of a non-magnetic high-resistance material; and an amorphous magnetic metallic film deposited, through an oxide layer, on one face of at least either one of said first core portion and said second core portion, which abuts on said first face, said amorphous magnetic metallic film having a thickness equal to a track width.

14. A magnetic head as claimed in claim 13, wherein the concentration of oxygen at a point in said oxide layer increases as said point is moved away from said amorphous magnetic metallic film.

15. A magnetic head as claimed in claim 13, wherein said amorphous magnetic metallic film includes at least one element selected from iron family elements consisting of iron, nickel and cobalt, while said oxide layer is composed of at least one oxide selected from iron family elements consisting of iron, nickel and cobalt.

16. A magnetic head as claimed in claim 15, wherein the concentration of oxygen at a point in said oxide layer increases as said point is moved away from said amorphous magnetic metallic film.

17. A magnetic head as claimed in claim 13, wherein said amorphous magnetic metallic film is made of at least one element selected from the group consisting of iron family elements composed of iron, nickel and cobalt, semi-metals, group IVa elements and group Va elements, while said oxide layer is composed of at least one oxide selected from iron family elements consisting of iron, nickel and cobalt.

18. A magnetic head as claimed in claim 17, wherein the concentration of oxygen at a point in said oxide layer increases as said point is moved away from said amorphous magnetic metallic film.

19. A magnetic head as claimed in claim 13, wherein either one of said first core portion and said second core portion is made of a material having high permeability and has a portion which is brought into contact with said magnetic recording medium, said portion being made of the non-magnetic high-resistance material.

20. A magnetic head including at least a core for constituting a magnetic circuit, and a magnetic gap formed in said core, said core comprising:

a first core portion and a second core portion in one unit so that said first core portion and said second core portion confront each other through said magnetic gap therebetween;

at least either one of said first core portion and said second core portion being formed with a first face which is brought into contact with a magnetic recording medium;

a portion including said first face of at least either one of said first core portion and said second core portion being made of a non-magnetic high-resistance material; and a plurality of insulating layers and amorphous magnetic metallic films being alternately deposited as a laminate of layers on one face of at least either one of said first core portion and said second core portion, which abuts on said first face, said laminate having a thickness equal to a track width.

21. A magnetic head as claimed in claim 20, wherein each said amorphous magnetic metallic film includes at least one element selected from iron family elements consisting of iron, nickel and cobalt.

22. A magnetic head as claimed in claim 20, wherein each said amorphous magnetic metallic film is made of at least one element selected from the group consisting of iron family elements composed of iron, nickel and cobalt, semi-metals, group IVa elements and group Va elements.

23. A magnetic head including at least a core for constituting a magnetic circuit, and a magnetic gap formed in said core, said core comprising:

a first core portion and a second core portion in one unit so that said first core portion and said second core portion confront each other through said magnetic gap therebetween;

either one of said first core portion and said second core portion comprising an amorphous magnetic metallic film deposited on a non-magnetic high-resistance substrate, said amorphous magnetic metallic film having a thickness equal to a track width; and one end face of said non-magnetic high-resistance substrate and said amorphous magnetic metallic film being brought into contact with a magnetic recording medium.

24. A magnetic head as claimed in claim 23, wherein said non-magnetic high-resistance substrate is of essentially insulative property.

* * * * *